US012644261B2

(12) United States Patent
Vicentini et al.

(10) Patent No.: US 12,644,261 B2
(45) Date of Patent: Jun. 2, 2026

(54) SOLAR THERMAL PANEL AND METHOD FOR PRODUCING WATER

(71) Applicant: AKUA S.R.L., Zane' (IT)

(72) Inventors: Massimo Vicentini, Camisano Vicentino (IT); Giovanni Ronda, Thiene (IT)

(73) Assignee: AKUA S.R.L., Zane' (IT)

( * ) Notice: Subject to any disclaimer, the term of this patent is extended or adjusted under 35 U.S.C. 154(b) by 283 days.

(21) Appl. No.: 18/265,071

(22) PCT Filed: Dec. 3, 2021

(86) PCT No.: PCT/IB2021/061295
§ 371 (c)(1),
(2) Date: Jun. 2, 2023

(87) PCT Pub. No.: WO2022/118273
PCT Pub. Date: Jun. 9, 2022

(65) Prior Publication Data
US 2024/0042369 A1 Feb. 8, 2024

(30) Foreign Application Priority Data

Dec. 3, 2020 (IT) ......................... 102020000029741

(51) Int. Cl.
*E03B 3/28* (2006.01)
*B01D 53/04* (2006.01)
(Continued)

(52) U.S. Cl.
CPC ............ *E03B 3/28* (2013.01); *B01D 53/0438* (2013.01); *B01D 53/265* (2013.01); *F24S 10/80* (2018.05);
(Continued)

(58) Field of Classification Search
None
See application file for complete search history.

(56) References Cited

U.S. PATENT DOCUMENTS 9,476,611 B1 * 10/2016 Shbeeb .................... F24S 30/45
2019/0309998 A1 * 10/2019 Alelyani ................. F25B 30/04
(Continued)

FOREIGN PATENT DOCUMENTS

CN 2218770 Y 1/1996
CN 209144913 U 7/2019
(Continued)

OTHER PUBLICATIONS

DE102010004195A1_ENG (Espacenet machine translation of Seifert) (Year: 2011).*
(Continued)

*Primary Examiner* — Gabriel E Gitman
(74) *Attorney, Agent, or Firm* — Carmel Patent Agency; Robert Ballarini

(57) ABSTRACT

Solar thermal panel (1) for producing water, comprising a frame (2), a reflective solar concentration surface (3), a heat exchanger (10) which is positioned at the solar focusing axis (A) and comprising a container (11) comprising an ambient humidity desiccator material (11a'), at least one opening (12), a first valve (13) which is positioned at the at least one opening (12) and selectively actuatable by moving from an open configuration to a closed configuration so as to selectively and reversibly allow the fluid-dynamic connection between the desiccator material (11a) and surrounding ambient air.

17 Claims, 6 Drawing Sheets

(51) Int. Cl.

| | |
|---|---|
| *B01D 53/26* | (2006.01) |
| *F24S 10/70* | (2018.01) |
| *F24S 10/80* | (2018.01) |
| *F24S 23/74* | (2018.01) |
| *H02S 40/22* | (2014.01) |
| *H02S 40/44* | (2014.01) |
| *F24S 30/40* | (2018.01) |

(52) U.S. Cl.
CPC .............. *F24S 23/74* (2018.05); *H02S 40/22* (2014.12); *H02S 40/44* (2014.12); *B01D 2253/102* (2013.01); *B01D 2253/106* (2013.01); *B01D 2253/108* (2013.01); *B01D 2253/204* (2013.01); *B01D 2257/80* (2013.01); *B01D 2259/40098* (2013.01); *F24S 10/70* (2018.05); *F24S 30/40* (2018.05)

(56) References Cited

U.S. PATENT DOCUMENTS

| | | | |
|---|---|---|---|
| 2020/0309416 A1* | 10/2020 | Hong | F24S 20/30 |
| 2020/0408425 A1* | 12/2020 | Zchori | F24F 5/0035 |
| 2021/0156124 A1* | 5/2021 | Yaghi | B01D 53/0462 |

FOREIGN PATENT DOCUMENTS

| | | | | |
|---|---|---|---|---|
| DE | 102010004195 A1 * | 7/2011 | .......... | H10F 77/488 |
| WO | WO-2016086751 A1 * | 6/2016 | .............. | E03B 3/28 |
| WO | WO-2018173013 A1 * | 9/2018 | .............. | E03B 3/28 |

OTHER PUBLICATIONS

WO2016086751A1_ENG (Espacenet machine translation of Huang) (Year: 2016).*

* cited by examiner

SOLAR THERMAL PANEL AND METHOD FOR PRODUCING WATER

TECHNOLOGICAL FIELD

The invention relates to a solar panel, an apparatus and a related method for producing water of the type including the features mentioned in the preamble of the independent claim.

TECHNOLOGICAL BACKGROUND

It is known that the problem relating to the possibility and ability for obtaining and preserving water reserves is increasingly becoming a key parameter for defining the habitable conditions of a predetermined environmental zone.

Furthermore, following the continuous demographic increase which is being recorded on our planet, there is identified an increasing need for making habitable zones which were previously uninhabitable or inhospitable because they do not have the most essential resources, including water (for example, deserts).

In the context of this worldwide need for water, different technological development groups are dedicating resources for the purpose of developing innovative and economical solutions directed towards obtaining drinking water from the humidity of the environment.

Products which are present in this technological area provide for the construction of an autonomous ("stand-alone") apparatus comprising a system with solar thermal panels which is able to heat a saline solution or water to temperatures less than 100° C.

This heated saline solution or water is used as a thermal vector for heating hygroscopic salts which slowly evaporate the water which is adsorbed therein. Subsequently, the evaporated water is caused to condense in a portion of space having a pressure less than ambient pressure in order to reduce the dew point.

The mechanical components used by the apparatus (impellers for circulating air in the different parts of the apparatus, pump for circulating the saline solution, etc.) are supplied by means of a photovoltaic panel integrated in the system.

However, this product is unsuitable for producing high quantities with a high output of drinking water as a result of the low temperatures of use (generally about 70° C.) which these types of products can reach.

Furthermore, another technological disadvantage is constituted by the need to use a system with vacuum pumps which allow, by means of a slight pressure reduction, a reduction in the dew point of the evaporated water, thereby allowing condensation.

Moreover, another disadvantage is that these systems can have extensive and bulky dimensions, making the installation thereof complex and disadvantageous in terms of space.

SUMMARY OF THE INVENTION

The Applicant has noted that different systems for producing water are not very efficient, involve costly installation and require significant resources in terms of space.

After various studies and investigations, the Applicant has perceived that a solution which allows a reduction of the space necessary together with a high capacity of production of water with a high quality may be of relevant interest and advantage in the present technical sector.

Therefore, the Applicant has found that the desired optimization of the above-mentioned processes is achieved by constructing a solar thermal panel which comprises therein all the necessary elements for being able to carry out efficient adsorption and desorption of ambient water, preferably in a simple manner according to desired time cycles which can be adapted to variable needs.

In particular, in a first aspect thereof, the invention relates to a solar thermal panel for producing water, comprising a frame and a reflective solar concentration surface which is secured to the frame.

Preferably, the reflective solar surface has a solar focusing axis, at which it concentrates incident solar rays.

Preferably, the solar thermal panel comprises a heat exchanger which is positioned at the solar focusing axis.

Preferably, the heat exchanger comprises a container.

Preferably, the container comprises an ambient humidity desiccator material.

Preferably, the container comprises at least one opening.

Preferably, the container comprises at least one valve which is positioned at the at least one opening.

Preferably, the at least one valve is selectively actuatable by moving from an open configuration to a closed configuration so as to selectively and reversibly allow the fluid-dynamic connection between the desiccator material and surrounding ambient air.

It is thereby possible to have a solar panel which is capable of carrying out alone a plurality of operations, including: concentrating solar rays at a predetermined location, collecting the ambient humidity by means of a desiccator material and then releasing it when the desiccator material and the water contained therein are heated to such a temperature as to allow a significant and functional evaporation.

Furthermore, as a result of this technical solution, it is possible to improve the quantity of water thereby produced.

Furthermore, it is thereby possible to bring about a high utilization of the heat supplied by the solar radiation and therefore to have an adsorption/desorption process for ambient water having a good output.

Again, it appears to be relevant to note that the improved solar thermal panel allows temperatures which are much higher than 100° C. to be reached. Under these conditions, it is possible to evaporate very efficiently the water contained in the desiccator material, thereby eliminating any presence of bacteria of other contaminating elements.

In this context, the term "desiccator material" is intended to be understood to indicate a material capable of actuating a desiccating process by adsorption. This involves desiccator materials preferably being materials which are generally hygroscopic and capable of reversibly bonding water molecules to themselves.

The above-mentioned solar concentration thermal panel allows a material to be heated locally to temperatures of several hundreds of degrees Centigrade.

In a second aspect thereof, the present invention relates to an apparatus for producing water from ambient humidity.

Preferably, the apparatus comprises the solar thermal panel for producing water having at least one of the technical features described above.

Preferably, the apparatus comprises a support device which is configured to secure the solar thermal panel rotatably with respect to a support plane.

The Applicant has thereby noted that it is possible to position the solar thermal panel more accurately, also allowing desired rotations thereof as a function of the position of the sun. As a result of this solution, it is possible to further increase the production output of sterilized water.

In a third aspect thereof, the present invention relates to a method for producing water from ambient humidity, comprising circulating forced air comprising humidity in a heat exchanger by means of a forced air circulation device.

Preferably, the heat exchanger comprises a desiccator material which is suitable for retaining a portion of the ambient humidity contained in the circulating air.

Preferably, the method comprises heating, by means of a solar concentration thermal panel comprising the heat exchanger, the desiccator material to a temperature greater than 100° C.

Preferably, the method comprises evaporating water vapour from the desiccator material by means of the heating step.

Preferably, the method comprises condensing the evaporated water vapour by cooling on at least one wall of the heat exchanger.

Preferably, the method comprises collecting the condensed water vapour in a collection device.

In at least one of the above-mentioned aspects, the present invention may have at least one of the additional preferred features indicated below.

Preferably, the container is a tubular cylinder.

There is thereby produced a container having an optimum shape for being able to be heated by the reflected radiation of the concentration panel.

Preferably, the container comprises two openings which are preferably constructed at respective opposing bases of the tubular cylinder.

There is thereby produced a better circulation of air and an increased capacity for selectively determining the absorption and desorption cycles of the ambient humidity by the desiccator material.

Preferably, the container has an opaque surface layer.

It is thereby possible to increase the absorption of the reflected radiation by the container and thereby to increase the output of the desired process.

Preferably, the container comprises a forced air circulation device which is received near the at least one opening so as to generate a forced air current ingoing into or outgoing from the container.

As a result of this technical solution, it is possible to improve the passage of air over the desiccator material contained in the container and therefore to improve the output of the process for producing purified water.

Preferably, the solar thermal panel comprises a transparent closure surface (preferably with respect to solar rays) which is secured to the frame and/or the reflective surface so as to define an internal closed space of the solar thermal panel and the container being at least partially contained, in a radial direction with respect to the focusing axis, inside the internal closed space.

In this manner, there is formed a type of greenhouse, in which inside the internal closed space the temperature further increases more rapidly by increasing the desorption speeds of the water by the desiccator material when desired.

Preferably, the container is completely contained in a radial direction with respect to the focusing axis inside the internal closed space.

There is thereby further improved the heating of the container and in particular of the desiccator material contained therein.

Preferably, the desiccator material is arranged in accordance with a longitudinal axis of the tubular cylinder.

In this manner, there is produced an ideal arrangement of the desiccator material in accordance with the geometry of the container and the air and water vapour flows which can be produced therein.

Preferably, the desiccator material is arranged in accordance with a multi-layered arrangement.

It is thereby possible to increase the absorption capacity of the desiccator material.

Preferably, the solar thermal panel comprises a collection device for the water which is produced inside the container and which is released from the desiccator material, which collection device is fluid-dynamically connected to a collection opening of the container by means of a first duct.

In this manner, the purified water produced is collected and is available for desired treatment steps or use which follow.

Preferably, the solar thermal panel comprises a photovoltaic panel.

It is thereby possible to supply electricity to the various components of the thermal panel without having a connection to an external electrical line. In other words, this solar thermal panel becomes an independent and autonomous water production system (stand-alone system).

Preferably, the photovoltaic panel is secured to the closure surface.

The space used by the photovoltaic panel is thereby optimized, at the same time ensuring an optimum solar exposure thereof and therefore a high electrical output.

Preferably, the photovoltaic panel comprises three modules which are arranged in an I-shaped manner.

Preferably, the three modules arranged in an I-shaped manner cover portions of the frame and the container so as not to remove useful radiation from the solar thermal panel.

Preferably, the apparatus for producing water from ambient humidity comprises a hydroponic greenhouse device connected to the solar thermal panel.

It is thereby possible to rapidly and effectively use the water produced directly in an optimized cultivation system.

According to an embodiment, the desiccator material comprises silica gel or zeolites, MOF, ACF (Activity Carbon Felt made from woven or nonwoven fabric).

In fact, the Applicant has verified that silica gel constitutes an advantageous compromise between the hygroscopic effect during the adsorption step and the transfer of water during the desorption step in terms of absence of hysteresis and rate of uptake and release of water molecules.

According to an embodiment, the container comprises at least one housing which is made from woven/nonwoven fabric and which is provided to contain the desiccator material.

As a result of this technical solution, the desiccator material is contained inside the container in a stable and secure manner having, at the same time, an optimum adsorption and desorption process for water molecules from the air passing through inside the heat exchanger as a result of the holes present in the structure of the woven/nonwoven fabric.

According to an embodiment, the two openings define an introduction side and a discharge side of the container and the heat exchanger, an advance direction of an air flow being defined between the introduction side and discharge side.

Preferably, the direction of the air flow is linear and the openings directly face the heat exchanger in the advance direction of the air flow. Advantageously, the openings are normal relative to the advance direction of the air flow.

Preferably, the desiccator material is continuous and monolithic.

Alternatively, the desiccator material comprises respective desiccating elements which are arranged in a plurality of successive desiccation zones in the advance direction of the air flow.

Preferably, each desiccation zone of the plurality of desiccation zones has a uniform or increasing number of desiccating elements in the direction of the air flow.

This configuration of the heat exchanger allows optimization of the adsorption effect of water molecules in the desiccator material without significantly reducing the flow rate of the air flow passing through.

According to an embodiment, the solar concentration thermal panel is parabolic.

Preferably, this parabolic form is determined according to a parabola having the formula:

$$Y=x^2/4F$$

where preferred values of F are between 300 mm and 500 mm, more preferably of 400 mm.

As a result of these forms, it is possible to optimize the reflection process of the solar rays which are incident on the container.

Preferably, the above-mentioned method comprises circulating air comprising humidity in the heat exchanger for a time less than or equal to half an hour, evaporating water from the desiccator material for a time less than or equal to half an hour, completing all the operations described above as being relevant to the above-mentioned method within one hour.

Alternatively, it is possible to circulate, for example, sea water which is collected in a desalinated, sanitized and drinkable state by evaporating.

According to an embodiment, the total cycle comprises two semi-cycles of at least half an hour each.

According to other technical solutions, it is possible to carry out the water adsorption step during the night and the desorption step during the day.

As a result of these technical solutions, it is possible to programme the apparatus for a daily quantity of water and to evaluate the coverage thereof as a function of the daily need desired.

BRIEF DESCRIPTION OF THE DRAWINGS

The features and advantages of the invention will be better appreciated from the detailed description of an embodiment which is illustrated, by way of non-limiting example, with reference to the appended drawings, in which.

DETAILED DESCRIPTION OF PREFERRED EMBODIMENTS OF THE INVENTION

Figure 1:
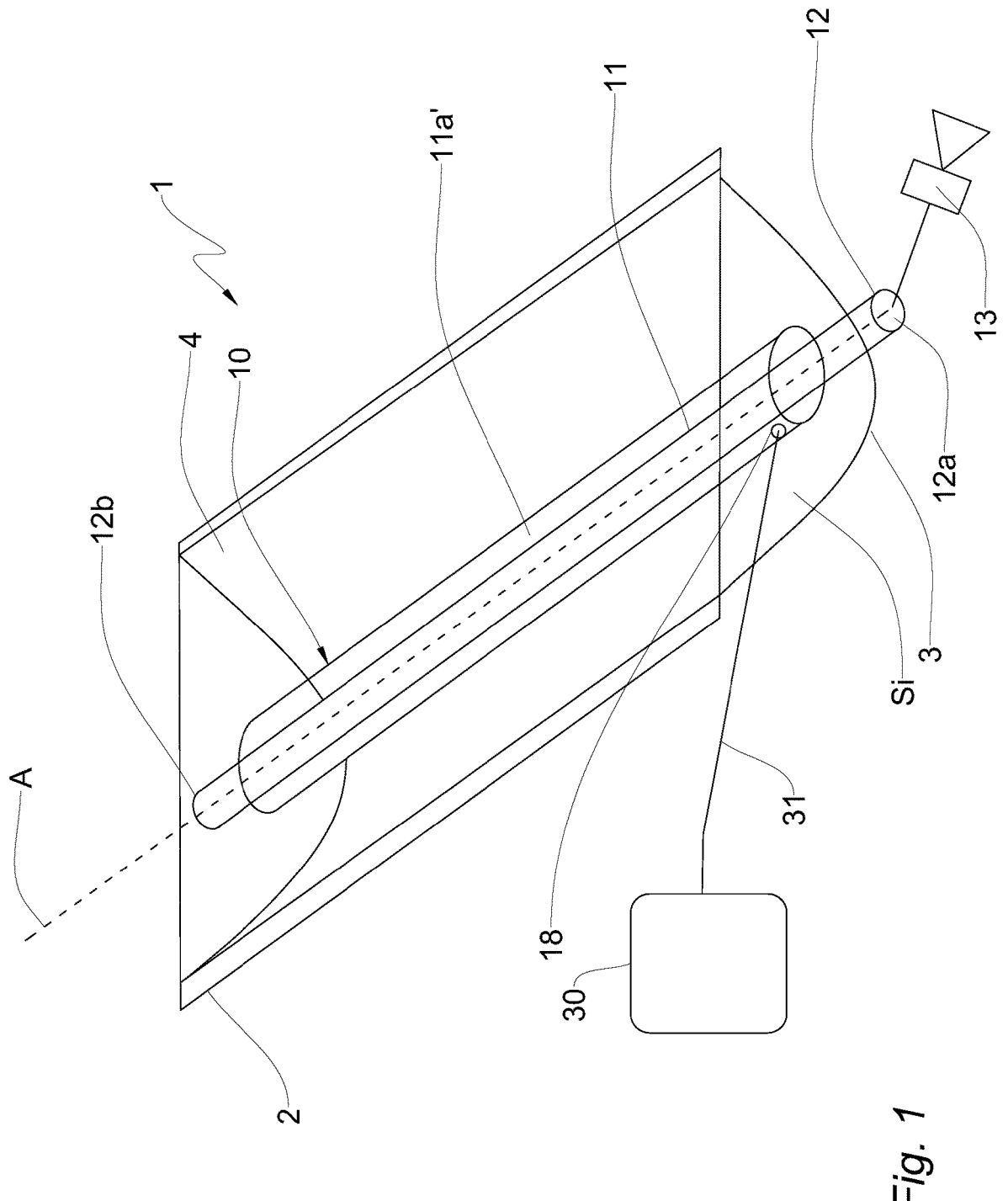
FIG. 1 is a schematic, perspective illustration of a solar thermal panel for producing water.

In FIG. 1, there is generally designated 1 a solar thermal panel for producing water from ambient humidity.

The invention produced according to the embodiments of the present invention allows drinking water with a high level of purity to be produced without bacteria or other contaminating factors.

Furthermore, the above-mentioned invention is capable of operating correctly in environments having an ambient humidity level between 10 and 100%.

As schematically illustrated in FIG. 1, the improved solar thermal panel 1 for producing water according to the present invention comprises a heat exchanger 10, the features of which will be described in greater detail below. The solar thermal panel 1 comprises a frame 2 and a reflective solar concentration surface 3 which is secured to the frame 2, having a solar focusing axis A, at which it concentrates incident solar rays.

Still with reference to FIG. 1, the heat exchanger 10 is positioned at the solar focusing axis A.

In greater detail, the heat exchanger 10 comprises a container 11 comprising in turn a desiccator material 11a' for ambient humidity, at least one opening 12 and at least a first valve 13 which is positioned in the region of the at least one opening 12.

The first valve 13 is selectively actuatable by moving from an open configuration to a closed configuration so as to allow in a selective and reversible manner the fluid-dynamic connection between the desiccator material 11a' and the surrounding ambient air.

With reference to FIGS. 1 to 6, it may be noted that the concentrated solar thermal panel 1 is thermally connected to the heat exchanger 10 in order to impart heat thereto.

In the context of the present invention, and as will be illustrated in greater detail below, the term "concentrated solar panel" is intended to refer to a reflective panel or a system of panels, wherein the solar radiation is concentrated at a respective focusing location or axis. Typically, concentrated solar panels allow extremely high temperatures to be reached, even greater than 600° C., in the region of the above-mentioned focusing location or axis.

With reference to FIG. 1, the concentrated solar thermal panel 1 is parabolic, that is to say, a reflective portion of the panel extends in accordance with a geometric parabola.

Figure 5:
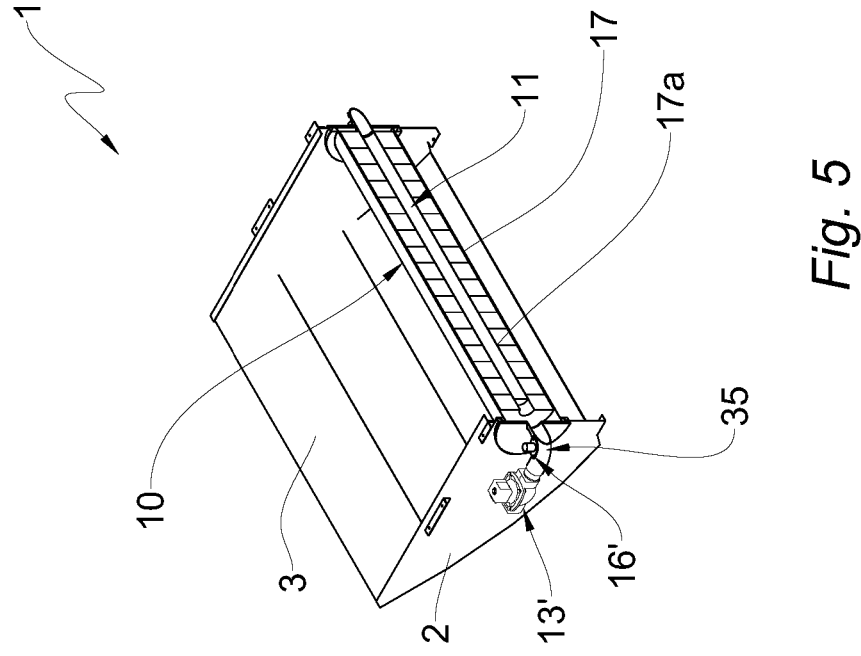
FIG. 5 is a perspective view of the cross-section V of the solar thermal panel of FIG. 4.
Figure 4:
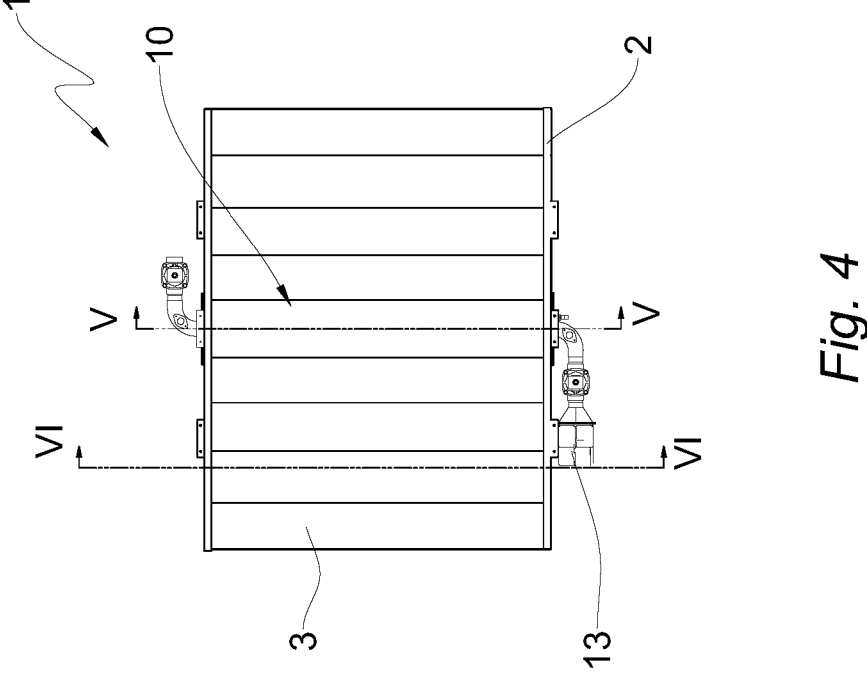
FIG. 4 is a plan view of the solar thermal panel of FIG. 1.

As shown in FIGS. 1, 4 and 5, the container 11 has a cylindrical tubular shape.

Figure 6:
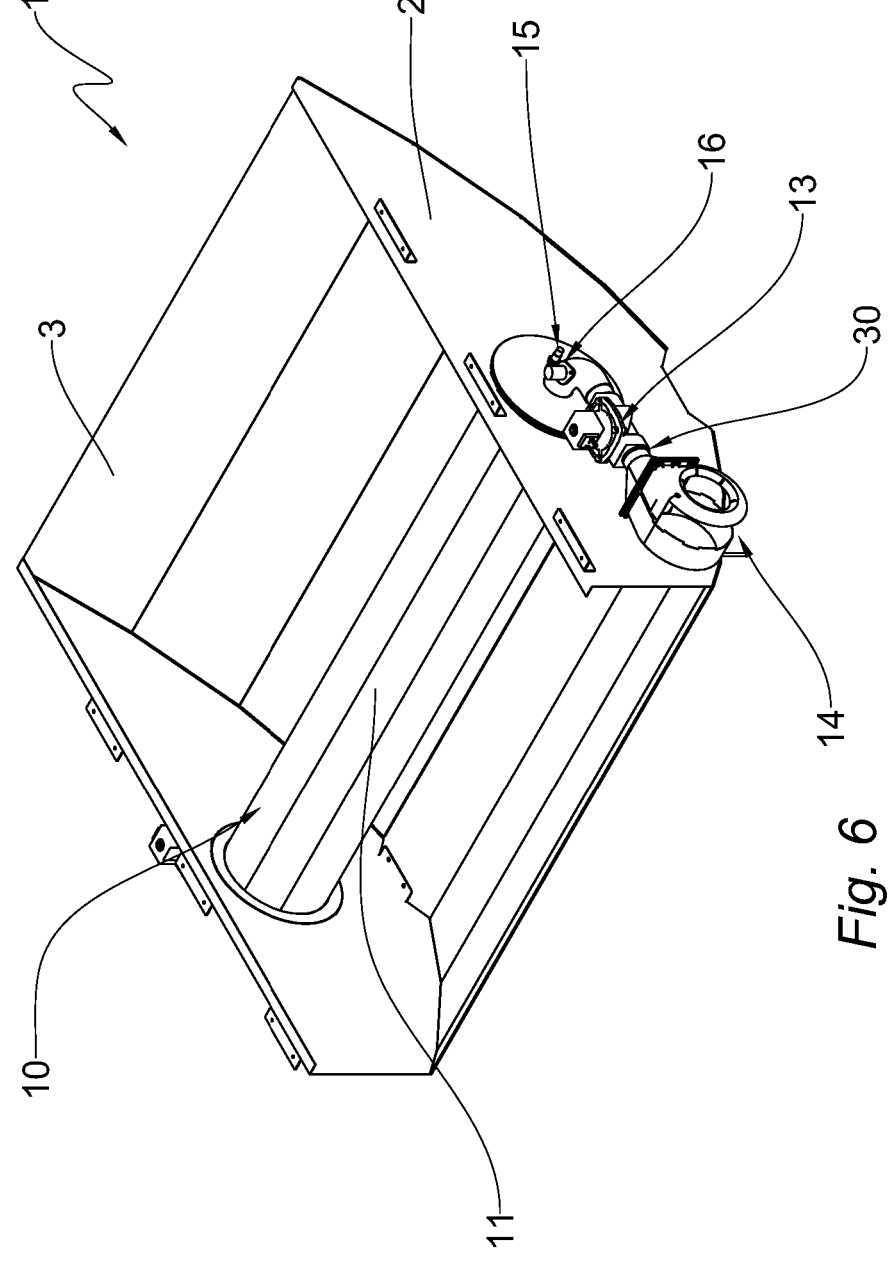
FIG. 6 is a perspective view of the cross-section VI of the solar thermal panel of FIG. 4.

As shown in FIGS. 5 and 6, the heat exchanger 10 has a cylindrical tubular shape and the container 11 is a tube which is placed inside it coaxially.

Still with reference to FIGS. 5 and 6, it may be noted how the container 11 extends longitudinally beyond the heat exchanger 10. In some embodiments, the at least one opening 12 includes two opposite openings 12a, 12b. Advantageously, the openings 12a, 12b are defined at each of the two opposite bases of the container 11, respectively.

These openings 12a and 12b are functional and allow the passage of air and therefore of ambient humidity inside the container 11 so that the desiccator material contained therein can adsorb the humidity present.

Still with reference to FIGS. 5 and 6, it may be noted that the container 11 has curved tubular portions once it is extended beyond the dimension of the exchanger 10 and the solar reflective surface 3. In this manner, it is possible to insert additional desired devices which are connected fluid-dynamically to the air passing through in the tube of the container 11, further reducing the required dimensions.

As shown in FIG. 6, the tubular container 11 extends beyond the exchanger 10, producing a first curved portion 30 which rotates through approximately 90° and in which a thermal sensor 15 (preferably an NTC probe), a humidity sensor 16 and a first forced air circulation device 14 are received. In the embodiment described by way of non-limiting example, this forced air circulation device 14 is an impeller.

Still considering FIG. 6, the tubular container 11 extends beyond the exchanger 10 at the opposite side to the side of the first curved portion 30, also curving in this case and rotating through approximately 90°, thereby forming a second curved portion 35. In this second curved portion 35, there are received an additional humidity sensor 16' and a second valve 13'.

The presence of the two humidity sensors 16, 16' at respective ends allows monitoring of the variation in the humidity inside the container 11 and therefore an understanding of how the evaporation process is working.

Preferably, in this sense, when the relative difference in humidity read between the two humidity sensors 16, 16' is substantially zero, the evaporation step is ended and the adsorption process begins.

In this configuration, the first valve 13 acts as an inlet valve for the humid air into the container 11 while the second valve 13' acts as an outlet valve for the humid air out of the container 11.

With reference to FIG. 5, it may be noted that there is present a gap 17 which is contained between the exchanger 10 and the container 11 and which comprises channels 17a which are arranged in a radial direction with respect to the longitudinal axis of the container 11 (and the focusing axis A) and which are formed so as to allow the free passage of the water vapour when it is desorbed by the desiccator material 11a'.

In this manner, it is possible to condense and collect the desorbed water vapour by cooling on the walls.

Furthermore, this gap can be used to facilitate the recirculation of the humid air during the adsorption steps.

Figure 7:
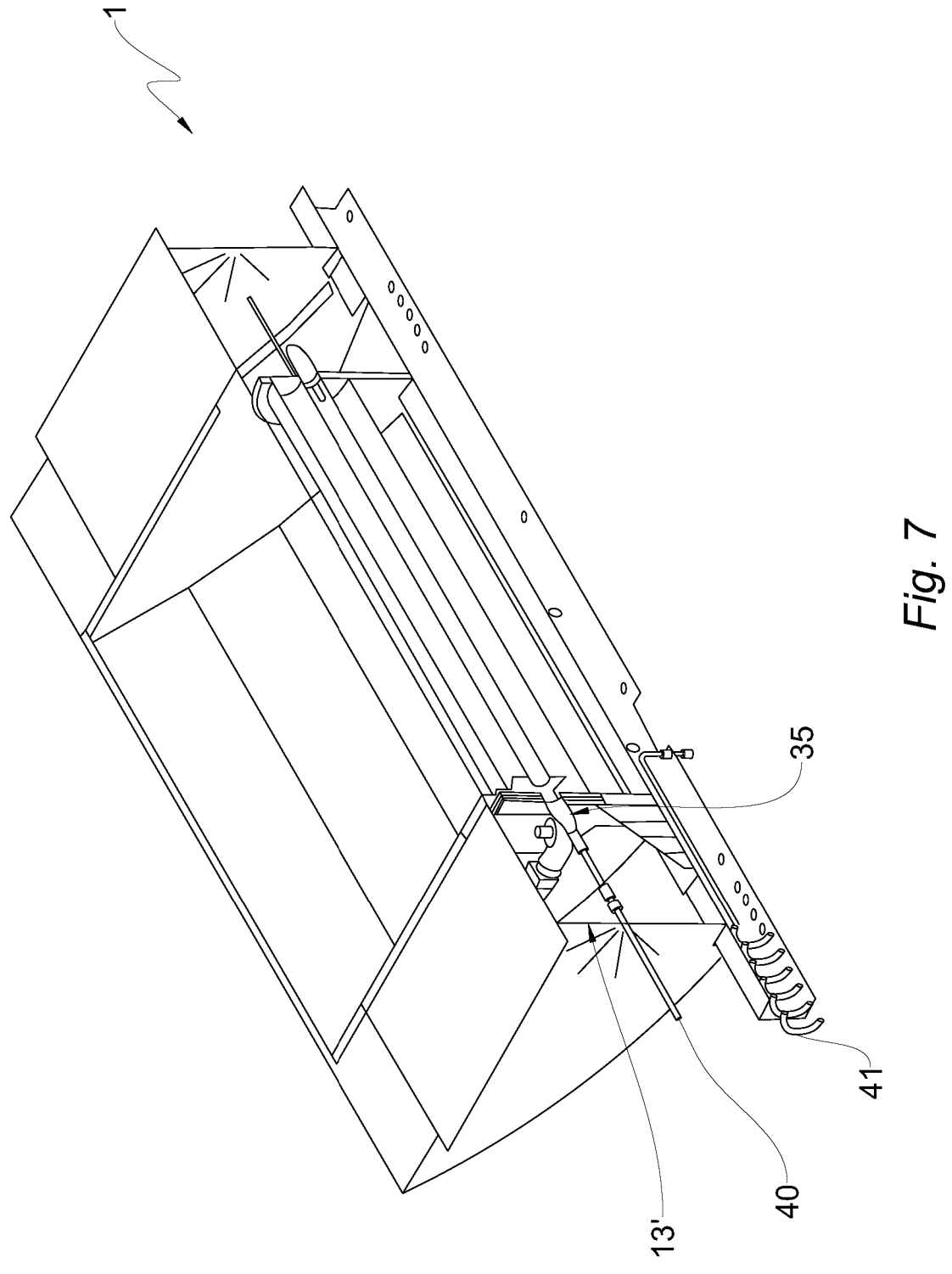
FIG. 7 is another perspective view of the solar thermal panel according to the present invention.

According to another embodiment shown in FIG. 7, the second portion 35 comprises in an initial section thereof a pit 40 which is fluid-dynamically connected to the container 11 and which is formed so as to collect or remove the water vapour which is desorbed by the desiccator material 11a'. Preferably, the pit 40 has a spatial extent which is substantially U-shaped and is connected to a coil arrangement 41 which serves to condense the collected water vapour in an optimum manner.

In an alternative form, the desiccator material 11a' can be positioned in the gap 17 and the tubular container 11 comprises holes which are suitable for discharging the water vapour in a uniform manner so that it is adsorbed by the desiccator material 11a'.

Preferably, the water vapour which is desorbed and condensed on the walls of the heat exchanger 10 is collected and brought into the region of a collection opening 18 which is connected by means of a first duct 31 to a collection device 30.

According to a preferred embodiment, the desiccator material 11a' comprises silica gel or similar hygroscopic materials.

The Applicant has found that silica gel is capable of adsorbing and desorbing the ambient humidity in a highly efficient and rapid manner without having significant hysteresis during the repetition of the cycles.

This affords the advantage of being able to repeat the adsorption and desorption operations a high number of times while keeping constant the performance levels of the desiccator material 11a'.

In order to be able to be contained in a simple manner, the desiccator material can be inserted inside a woven/nonwoven bag.

This woven/nonwoven bag allows the desiccator material 11a' to be retained therein efficiently and at the same time allows an effective transpiration by means of the individual holes present in the structure during the adsorption and desorption steps.

In any case, it is evident that there can also be provided different solutions and configurations of the desiccator material 11a' inside the heat exchanger 10.

Figure 2:
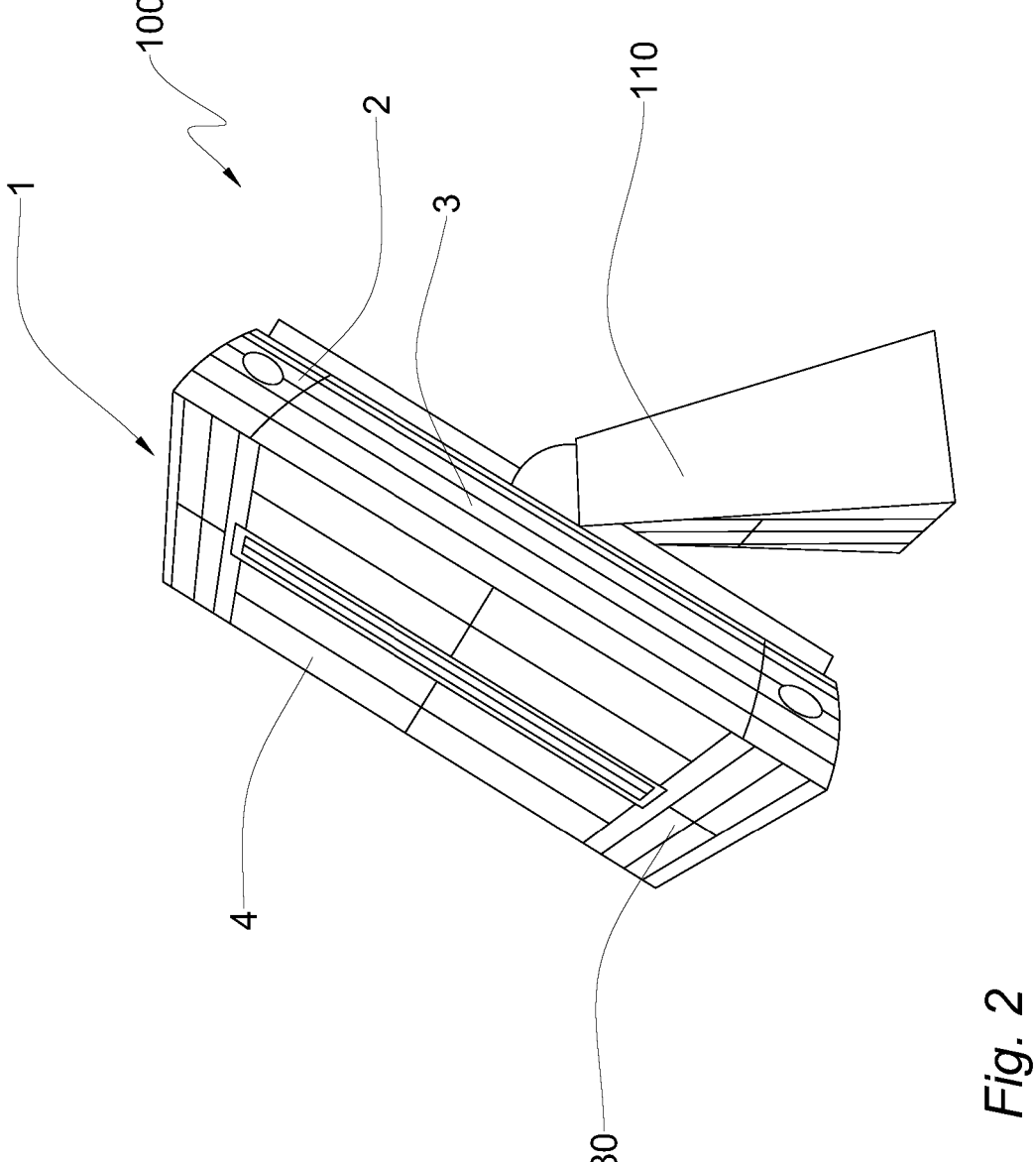
FIG. 2 is a perspective view of an apparatus for producing water, comprising the solar thermal panel of FIG. 1.

With reference to FIGS. 1 and 2, the solar thermal panel 1 comprises a closure surface 4 which is transparent to incident radiation and which is secured to the frame 2 so as to define an internal closed space Si of the solar thermal panel 1. As may be noted, the container 11 is at least partially contained inside the internal closed space Si in a longitudinal direction while it is completely contained in the internal closed space Si in a radial direction with respect to the focusing axis A.

With reference to FIGS. 1 and 2, the solar thermal panel 1 comprises a photovoltaic panel 80, which is preferably secured to the closure surface 4. Still with reference to FIG. 2, the photovoltaic panel 80 comprises three modules which are arranged in an I-shaped manner.

Figure 3:
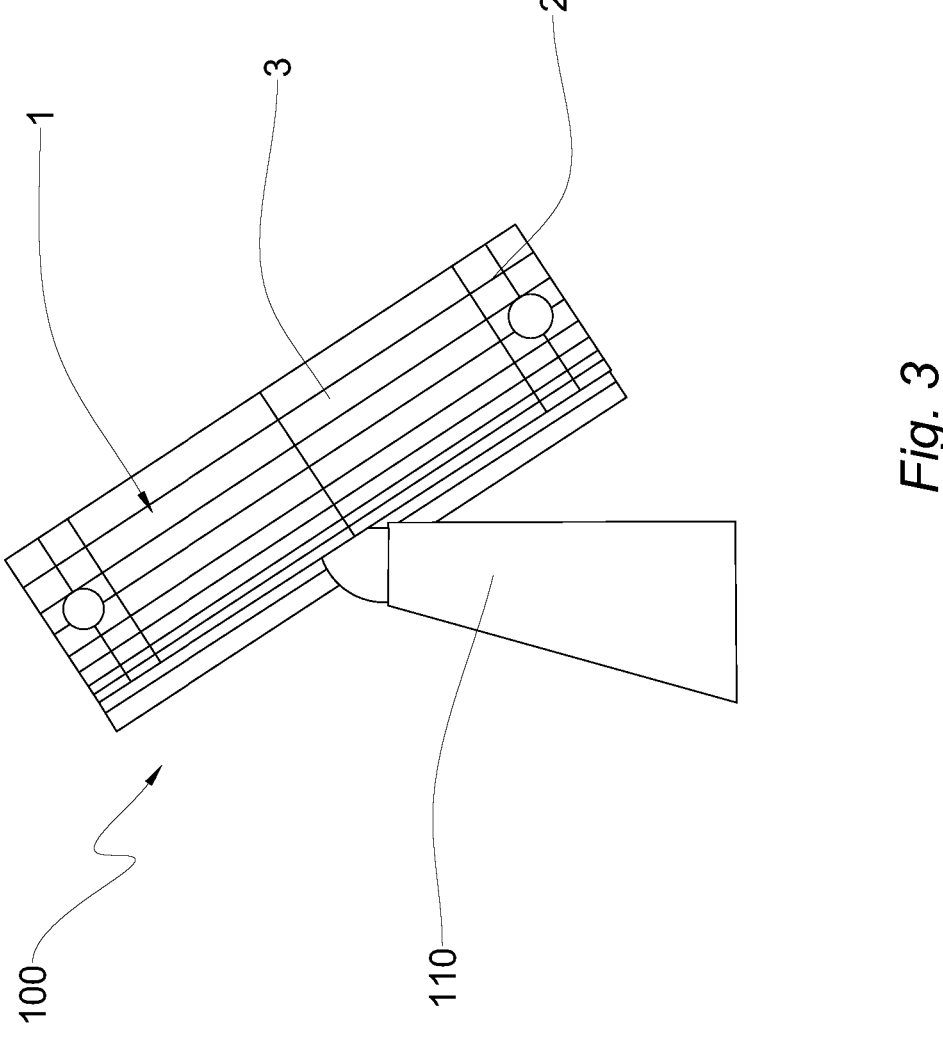
FIG. 3 is a side view of the apparatus of FIG. 2.

With reference to FIGS. 2 and 3, it may be noted that the solar thermal panel 1 is rotatably secured to a support 110, thereby forming an apparatus 100 for producing water.

In greater detail, the support 110 allows a rotation about a horizontal axis so as to be able to bring about a preferred inclination with respect to the vertical and a rotation about a vertical axis so as to rotate the solar thermal panel 1, in a manner best tracking the trajectory of the sun.

The support 110 also comprises one or more motors which are necessary for moving the desired members.

Furthermore, the apparatus 100 comprises a hydroponic or aeroponic greenhouse (not shown in the Figures) which is connected fluid-dynamically downstream of the water collection device 30.

Not only does it thereby become possible to produce purified water which can be consumed by human beings, but it is also possible to cultivate desired plants efficiently.

The operating modes of the apparatus 1 for producing water from ambient humidity, defining the method of the present invention, comprise the operations set out below.

Air comprising humidity is circulated by means of the impeller 14 through the first opening 12a and inside the container 11 of the heat exchanger 10 and, as a result of the presence of the desiccator material 11a', a portion of the ambient humidity contained in the air is retained.

The heat exchanger 10 is heated by means of the concentrated solar thermal panel 1 to a temperature greater than or equal to 100° C.

The two operations can be carried out at the same time or separately as a result of the presence of the first valve 13. When the desiccator material 11a' has absorbed sufficient humidity, the first valve 13 is closed. The opposite second valve 13' is also preferably closed so as to delimit a finite volume to be processed.

The concentrated solar radiation from the reflective surface 2 heats the heat exchanger 10, bringing it to temperatures greater than 100° C. Under these conditions, the water vapour which is collected by the desiccator material 11a' is desorbed by evaporation and then condensed by cooling on the walls of the heat exchanger 10 itself.

At this point, it is possible to collect the water vapour which is condensed to form water in the collection device 30.

Preferably, the above-mentioned method comprises condensing the evaporated water vapour either by cooling on a wall which is contained in the heat exchanger 10 under standard ambient pressure conditions (equal to approximately 1 atm) or by cooling with mixing of air at temperatures less than the temperature of the water vapour.

Alternatively, the condensation of the water can be optimized by using a centrifugal filter (advantageously comprising a lamellar filter) which allows the condensed water to be separated from the mixed gas by means of a centrifuge.

The management of the two water adsorption and desorption/condensation steps can be assigned to a simple processing unit (not shown in the Figures) which allows the actuation operations to be controlled and programmed.

In one embodiment of the above-mentioned method, for example, it is possible for air comprising ambient humidity, and therefore absorbed humidity, to be circulated in the heat exchanger 10 for a time of at least half an hour.

Preferably, the circulation of the air may be carried out for a time greater than one hour.

In this manner, the desiccator material 11a' is placed under conditions so as to be able to adsorb molecules of water therein (if it is not already saturated).

Subsequently, water vapour is evaporated from the desiccator material 11a' for a time which is preferably at least half an hour.

Preferably, all the operations previously described in the water adsorption and desorption steps in the desiccator material 11a' are completed within an hour.

Advantageously, these operations are repeated a number of times over the course of twenty four hours. This operating mode allows programming of the water production on a daily basis and therefore having an expectation of the possibility of production which is predictable and reproducible.

Alternatively, for example, it may be possible to programme the two above-mentioned steps in such a manner that each one lasts 12 hours.

The final user will have the ability to define the water adsorption and desorption steps in accordance with individual specific needs.

The invention claimed is:

1. A solar thermal panel for producing water, comprising
a frame,
a reflective solar concentration surface which is secured to the frame having a solar focusing axis, at which the solar concentration surface concentrates incident solar rays,
a heat exchanger which is positioned at the solar focusing axis and comprising a container, the container comprising
an ambient humidity desiccator material,
at least one opening,
a first valve which is positioned at the at least one opening and which is selectively actuatable by moving from an open configuration to a closed configuration so as to selectively and reversibly allow a fluid-dynamic connection between the desiccator material and surrounding ambient air, wherein the container has an elongate form and is arranged parallel with the solar focusing axis.

2. The solar thermal panel according to claim 1, further comprising two openings which are arranged at opposite ends of the container.

3. The solar thermal panel according to claim 2, wherein the two openings define an introduction side and a discharge side of the container, an advance direction of an air flow being defined between the introduction side and discharge side and wherein the direction of the air flow is linear and the openings directly face the heat exchanger in the advance direction of the air flow.

4. The solar thermal panel according to claim 2, wherein the openings are constructed at respective opposing bases of the container.

5. The solar thermal panel according to claim 1, wherein the container comprises a forced air circulation device which is received near the at least one opening so as to generate a forced air current ingoing into or outgoing from the container.

6. The solar thermal panel according to claim 1, further comprising a transparent closure surface which is secured to the frame and/or the reflective surface so as to define an internal closed space of the solar thermal panel and the container being at least partially contained, in a radial direction with respect to the focusing axis, inside the internal closed space.

7. The solar thermal panel according to claim 6, further comprising a photovoltaic panel, wherein the photovoltaic panel is secured to the transparent closure surface.

8. The solar thermal panel according to claim 1, wherein the desiccator material is arranged in accordance with a longitudinal axis of the container.

9. The solar thermal panel according to claim 1, further comprising a collection device for water which is produced inside the container and which is released from the desiccator material, which collection device is fluid-dynamically connected to a collection opening of the container by means of a first duct.

10. The solar thermal panel according to claim 1, wherein the solar thermal panel is parabolic.

11. The solar thermal panel according to claim 1, further comprising at least one humidity sensor for measuring a humidity value inside the container.

12. An apparatus for producing water from ambient humidity, comprising
at least one solar thermal panel for producing water according to claim 1,
a support device which is configured to secure the solar thermal panel with permitted rotation with respect to a support plane.

13. A solar thermal panel for producing water, comprising
a frame,
a reflective solar concentration surface which is secured to the frame having a solar focusing axis, at which the solar concentration surface concentrates incident solar rays,
a heat exchanger which is positioned at the solar focusing axis and comprising a container, the container comprising
an ambient humidity desiccator material,
at least one opening,
a first valve which is positioned at the at least one opening and which is selectively actuatable by moving from an open configuration to a closed configuration so as to selectively and reversibly allow a fluid-dynamic connection between the desiccator material and surrounding ambient air wherein the desiccator material is arranged in accordance with a multi-layered arrangement.

14. A solar thermal panel for producing water, comprising
a frame, a reflective solar concentration surface which is secured to the frame having a solar focusing axis, at which the solar concentration surface concentrates incident solar rays, a heat exchanger which is positioned at the solar focusing axis and comprising a container, the container comprising an ambient humidity desiccator material, at least one opening, a first valve which is positioned at the at least one opening and which is selectively actuatable by moving from an open configuration to a closed configuration so as to selectively and reversibly allow a fluid-dynamic connection between the desiccator material and surrounding ambient air, wherein the container comprises at least one housing which is made from woven/nonwoven fabric and which is provided to contain the desiccator material.

15. A solar thermal panel for producing water, comprising a frame, a reflective solar concentration surface which is secured to the frame having a solar focusing axis, at which the solar concentration surface concentrates incident solar rays, a heat exchanger which is positioned at the solar focusing axis and comprising a container, the container comprising an ambient humidity desiccator material at least one opening, a first valve which is positioned at the at least one opening and which is selectively actuatable by moving from an open configuration to a closed configuration so as to selectively and reversibly allow a fluid-dynamic connection between the desiccator material and surrounding ambient air wherein the desiccator material comprises respective desiccating elements which are arranged in a plurality of successive desiccation zones in an advance direction of an air flow.

16. A solar thermal panel for producing water, comprising a frame, a reflective solar concentration surface which is secured to the frame having a solar focusing axis, at which the solar concentration surface concentrates incident solar rays, a heat exchanger which is positioned at the solar focusing axis and comprising a container, the container comprising an ambient humidity desiccator material, at least one opening, a first valve which is positioned at the at least one opening and which is selectively actuatable by moving from an open configuration to a closed configuration so as to selectively and reversibly allow a fluid-dynamic connection between the desiccator material and surrounding ambient air further comprising a gap which is contained between the heat exchanger and the container, which comprises channels which are arranged in a radial direction with respect to a longitudinal axis of the container and which are formed so as to allow the free passage of water vapor when it is desorbed by the desiccator material.

17. A method for producing water from ambient humidity, the method comprising:

circulating forced air comprising humidity in a heat exchanger by means of a forced air circulation device, the heat exchanger comprising a desiccator material which is suitable for retaining a portion of the ambient humidity contained in the circulating air, heating, by means of a solar concentration thermal panel comprising the heat exchanger, the desiccator material to a temperature greater than 100° C., evaporating water vapor from the desiccator material, condensing the evaporated water vapor by cooling on at least one wall of the heat exchanger and collecting it in a collection device, wherein the air is circulated in the heat exchanger for a time of 12 hours, during the day, and water vapor is evaporated for a time of 12 hours, during the night.

* * * * *